(12) United States Patent
Skóra et al.

(10) Patent No.: US 10,580,593 B2
(45) Date of Patent: Mar. 3, 2020

(54) SCREW AND METHOD OF ITS MANUFACTURE

(71) Applicant: GAWEŁ ZAKŁAD PRODUKCJI ŚRUB S.A., Strażów (PL)

(72) Inventors: Mariusz Skóra, Łańcut (PL); Boguslaw Buszta, Żolynia (PL); Dariusz Kluz, Rzeszów (PL)

(73) Assignee: GAWEL ZAKLAD PRODUKCJI SRUB S.A, Strazow (PL)

( * ) Notice: Subject to any disclaimer, the term of this patent is extended or adjusted under 35 U.S.C. 154(b) by 652 days.

(21) Appl. No.: 15/119,997

(22) PCT Filed: Mar. 16, 2015

(86) PCT No.: PCT/PL2015/050005
§ 371 (c)(1),
(2) Date: Aug. 18, 2016

(87) PCT Pub. No.: WO2015/147667
PCT Pub. Date: Oct. 1, 2015

(65) Prior Publication Data
US 2017/0062145 A1  Mar. 2, 2017

(30) Foreign Application Priority Data
Mar. 24, 2014 (PL) .......................... 407642

(51) Int. Cl.
*F16B 35/00* (2006.01)
*H01H 1/025* (2006.01)
(Continued)

(52) U.S. Cl.
CPC ............. *H01H 1/025* (2013.01); *B23G 9/001* (2013.01); *F16B 35/00* (2013.01); *H01H 1/021* (2013.01); *H01H 11/042* (2013.01)

(58) Field of Classification Search
CPC ........ F16B 23/003; F16B 35/00; F16B 35/06; F16B 37/14
(Continued)

(56) References Cited

U.S. PATENT DOCUMENTS 820,110 A * 5/1906 Harrison ................. B29C 73/14
152/369
2,362,999 A * 11/1944 Hewitt .................. B25B 13/485
411/403

(Continued)

FOREIGN PATENT DOCUMENTS

DE 738645 C 8/1943
DE 7206287 U 10/1972
(Continued)

OTHER PUBLICATIONS

International Search Report for application No. PCT/PL2015/050005, dated Jun. 22, 2015, 3 pages.

*Primary Examiner* — Roberta S Delisle
(74) *Attorney, Agent, or Firm* — Ziegler IP Law Group, LLC

(57) ABSTRACT

A screw includes a barrel-shaped central pin is surrounded by a cylindrical bore having a conical bottom The cylindrical insert is seated in the cylindrical bore. The top surface of the central pin is lowered below the top surface of the head. The walls of the pin (4) are convex towards the insert. Manufacturing the screw includes producing the threaded part with the head with the cylindrical recess with the cone-shaped bottom. The cylindrical insert terminates at one end with a bevel with an inclination angle of α=10-30°. The insert is introduced into the cylindrical recess. The upper part of the insert protruding from head of the screw is pre-shaped. The pin is upset using an appropriate tool and simultaneously the top surface of the pin is lowered below the top surface of the head.

7 Claims, 3 Drawing Sheets

(51) Int. Cl.
*H01H 11/04* (2006.01)
*B23G 9/00* (2006.01)
*H01H 1/021* (2006.01)

(58) Field of Classification Search
USPC ................................ 411/377, 383, 396, 403
See application file for complete search history.

(56) References Cited

U.S. PATENT DOCUMENTS

| | | | | |
|---|---|---|---|---|
| 5,449,260 | A * | 9/1995 | Whittle | ............... F16B 23/0007 411/377 |
| 6,186,718 | B1 * | 2/2001 | Fogard | ................ F16B 23/0038 411/403 |
| 6,302,630 | B1 * | 10/2001 | Grant | ........................ A47G 3/00 411/372.6 |
| 7,066,062 | B2 * | 6/2006 | Flesher | ................. B25B 13/485 411/403 |
| 7,162,939 | B2 * | 1/2007 | Totsu | .................... B25B 13/485 411/403 |
| 8,992,151 | B2 * | 3/2015 | Parker | ................. F16B 23/0046 411/402 |

FOREIGN PATENT DOCUMENTS

| | | |
|---|---|---|
| EP | 1995745 A1 | 11/2008 |
| GB | 1284954 A | 8/1972 |
| SU | 642779 A1 | 1/1979 |

* cited by examiner

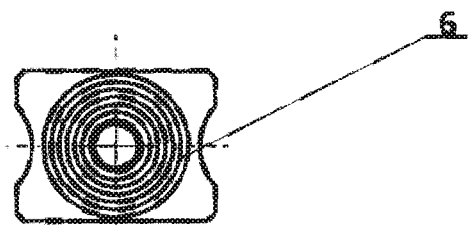
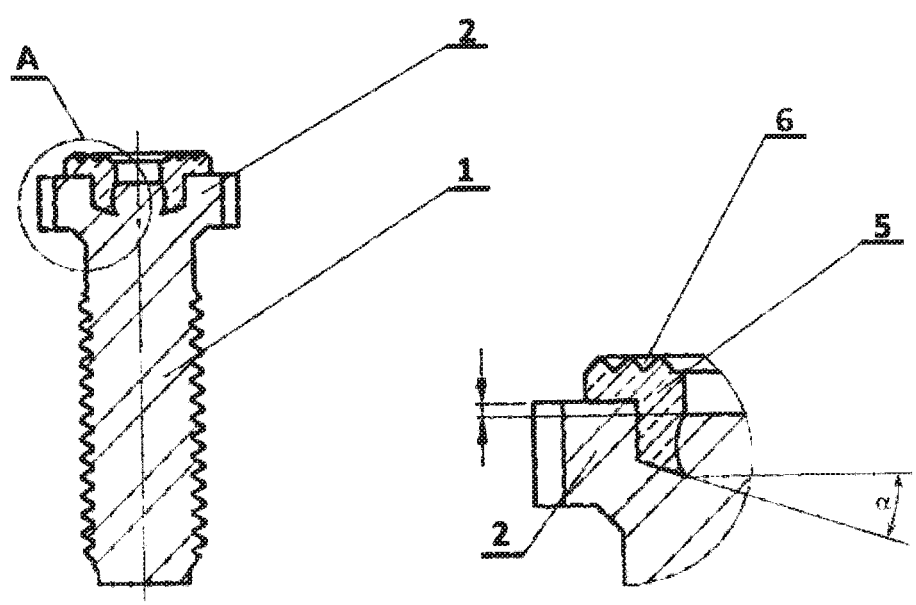
Fig. 1
Fig. 2.
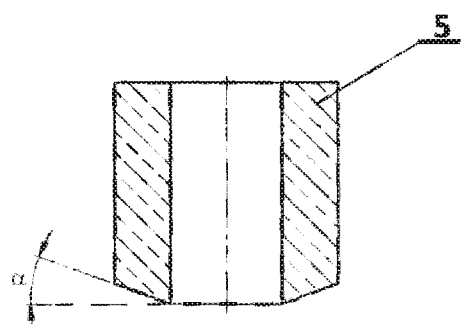
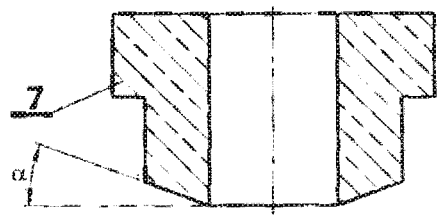
Fig. 3.
Fig. 4.

Operation A

Operation B

Operation C

SCREW AND METHOD OF ITS MANUFACTURE

FIELD

The aspects of the disclosed embodiments relate to a screw, particularly designed for terminals of electric starters used in vehicles, boats and aircrafts, and a method of its manufacture.

BACKGROUND

From patent No. EP 1995745 a screw is known designed for the same purpose, the said screw having the main part made of material other than copper or copper alloys, mostly of steel, and provided with a thread and a head with a bore which is positioned coaxially within the screw and has side walls convergent towards the bore inlet, and a bottom in the form of a convex truncated cone. In the head bore an insert made of copper or copper alloy is seated in such a way that it remains in close contact with the bore walls and it is also seated in a circumferential groove located at a certain distance from the bore inlet in the top surface of the head. Preferably, the top surface of the insert is provided with grooves.

A method of manufacturing the screw consists in that the main part and the head of the screw are formed from a bar stock, a rolled wire rod or an extruded wire rod made by cold forging, and further the bore is produced which extends along the screw axis and has the bottom in the form of a convex truncated cone. Then the insert made of copper or copper alloy is introduced into the bore and, upon the action of appropriate pressure, the insert is seated in the bore in such a manner that the insert material fully fills the entire bore, and grooves are formed in the top surface of the insert. The element shaped in such a way is subjected to plastic working using a suitable tool which forms a bore with side walls convergent towards the bore inlet and a circumferential groove in the top surface of the head at a certain distance from the bore inlet.

The screw obtained in the process described above ensures permanent seating of the copper or copper alloy insert in the head of the screw whose remaining part is basically made of steel; however, the electrochemical corrosion caused by the difference in electrochemical potentials between copper or copper alloys and steel cannot be avoided and, therefore, electrical properties of electric contact between the insert and the head progressively worsen during the use of the screw mounted in the starter.

SUMMARY

The aspects of the disclosed embodiment are directed to provide a solution which eliminates this disadvantage, i.e. designing a screw which features electric current conductivity constant with time and, also, whose production costs are relatively low.

A screw according to the aspects of the disclosed embodiments comprises a threaded part with a head, the said threaded part having an upset central pin, preferably barrel-shaped, which is surrounded by a cylindrical bore having a conical bottom with an inclination angle of $\alpha$ from 10° to 30°, and a cylindrical insert with an axial through hole which is made of copper, aluminium, copper alloy or aluminium alloy and is permanently seated in this cylindrical bore, and the top surface of the central pin is lowered by d from 0.1 mm to 0.6 mm below the top surface of the head. Preferably, the top surface of the cylindrical insert with the axial through hole is provided with grooves concentric with the screw axis.

Preferably, the outer surfaces of the cylindrical bore are parallel to the screw axis.

Preferably, the bottom of the cylindrical bore has the form of a circular sector with the radius of R from 0.8 L to 1.2 L, where L is equal to the difference between the bore diameter and the pin diameter.

Preferably, the top surface of the pin has a concave shape. The pin walls are convex towards the insert.

A method according to the aspects of the disclosed embodiments comprises forming, using the known plastic working and machining methods, a threaded part together with a head with cylindrical recess which has a cone-shaped bottom with an inclination angle of $\alpha$ from 10° to 30° surrounding a cylindrical central pin, whereas the surface of the head and the surface of the pin are coplanar. In a separate machining operation a cylindrical insert with an axial through hole made of copper, aluminium, copper alloy or aluminium alloy is produced which terminates at one end with a bevel with an inclination angle of $\alpha$ from 10° to 30° and whose inner diameter and outer diameter correspond to respective diameters of the cylindrical bore in the head. Preferably, the insert with the axial through hole is equipped with a flange positioned at the end of the insert which is opposite to the conical end. In next operation the insert is introduced into the cylindrical bore and the upper part of the insert which protrudes from the screw head is pre-shaped. Then, in one plastic working operation, the pin is upset using an appropriate tool and the top surface of the pin is lowered below the top surface of the head, and the final shape of the upper part of the insert protruding from the head is formed together with grooves recessed in its top surface concentrically with the screw axis.

Preferably, in the first stage of screw manufacturing the threaded part is formed together with the head with cylindrical recess which has the bottom in the form of a circular sector with the radius of R from 0.8 L to 1.2 L, where L is equal to the difference between the bore diameter and the pin diameter, and in separate operation the cylindrical insert with the axial through hole is produced which has the chamfer with the radius of R from 0.8 L to 1.2 L provided at one end.

Screws produced according to this method feature a permanent and corrosion-resistant connection of the upper insert made of copper, aluminium, copper alloy, or aluminium alloy, with the remaining part of the screw made of steel, and the method itself is simple. Moreover, due to a quantitatively lower fraction of relatively expensive metals such as copper, aluminium, copper alloys and aluminium alloys, the production cost of these screws is lower when compared with screws known from previous solutions.

DESCRIPTION OF THE DRAWINGS

The aspects of the disclosed embodiments will be presented in more detail with reference to exemplary embodiments presented in the drawing, where:

FIG. 1 depicts the cross-section and top view of the screw;
FIG. 2 presents detail "A" indicated in FIG. 1;
FIG. 3 depicts the cross-section of the cylindrical insert;
FIG. 4 presents the cross-section of the cylindrical insert with flange.

DETAILED DESCRIPTION

Example 1

Figure 5:
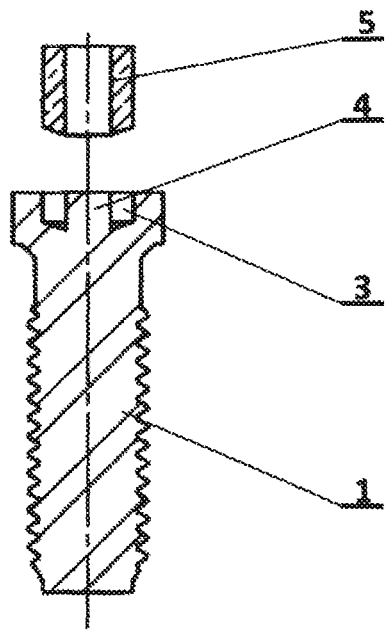
FIGS. 5 to 8 illustrate the consecutive phases of manufacturing the screw using plastic forming method.
Figure 6:
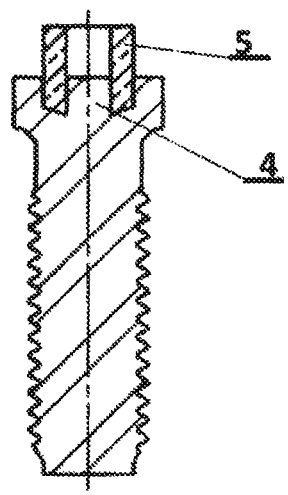
Figure 7:
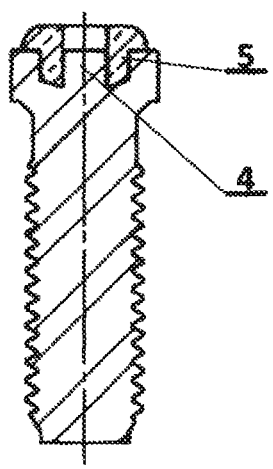
Figure 8:
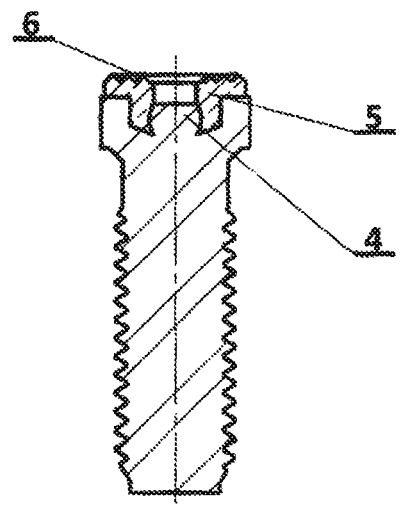
Figure 9:
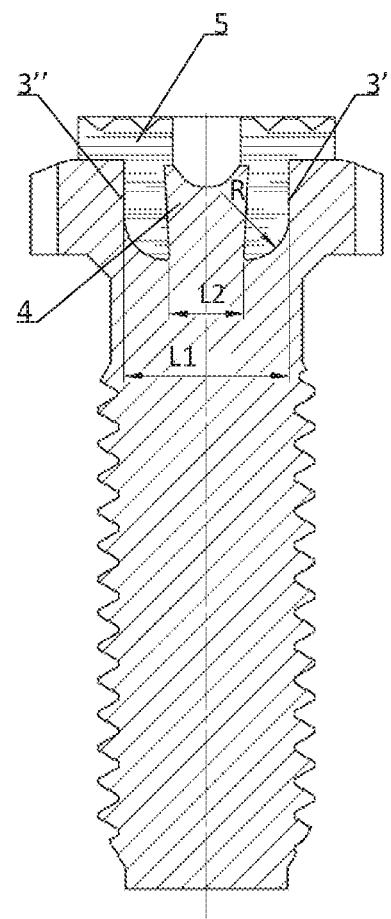
FIG. 9 presents the screw in an alternative version which has the bottom with the radius R and parallel outer surfaces of the bore.

Using known methods of plastic working and machining, the threaded part 1 is produced together with the head 2 in which the cylindrical recess 3 with a cone-shaped bottom having the inclination angle of α=20° surrounding the cylindrical central pin 4, and where the surface of the head 2 and the surface of the pin 4 are coplanar. In a separate machining operation the cylindrical insert 5 with the axial through hole is produced from a copper alloy, the said insert terminating at one end with a bevel with an inclination angle of α=20° and having the inner diameter and outer diameter corresponding to the respective diameters of the cylindrical recess 3 in the head 2. Next, in operation A the insert 5 is introduced into the cylindrical recess 3. Then in operation B the upper part of the insert 5 is pre-shaped which protrudes above screw head 2. Further, in one plastic working operation C, the pin 4 is upset using an appropriate tool, the top surface of the pin 4 is lowered below the top surface of head 2 and the final shape of the upper part of the insert 5 is formed together with grooves 6 recessed in the top surface concentrically with the screw axis.

The screw produced in this method has the cylindrical copper alloy insert 5 permanently seated in the head 2 with top surface of central pin 4 lowered by d=0.3 mm below the surface of the head 2.

Example 2

An identical screw is produced using the method described in Example 1, but the insert 5 is made of aluminium alloy and provided with a flange 7.

Example 3

Using known methods of plastic working or machining, the threaded part 1 is produced together with the head 2 in which the cylindrical recess 3 is provided, surrounding the cylindrical central pin 4, the said recess having the bottom in the form of a quadrant sector with the radius R between 1.2 L and 0.8 L, and where the surface of the head 2 and the surface of the pin 4 are coplanar. Moreover, the top surface of the pin 4 has a concave shape. In a separate machining or plastic working operation, the cylindrical insert 5 is produced from copper alloy, the said insert having the inner diameter and outer diameter corresponding to the respective diameters of the cylindrical recess 3 in the screw head. Next, in operation A the insert 5 is introduced into the cylindrical recess 3. Then in operation B the upper part of the insert 5 is pre-shaped which protrudes above the screw head 2. Further, in one plastic working operation C, the pin 4 is upset using an appropriate tool, and simultaneously the top concave plane of the pin 4 is lowered below the top surface of head 2 and, as a result, the walls of the pin 4 slightly draw aside towards the insert 5 and the final shape of the upper part of the insert 5 is formed together with grooves 6 recessed in the top surface concentrically with the screw axis.

What is claimed is:

1. A screw comprising:
   a threaded part;
   a head extending from the threaded part, the head having a cylindrical bore and a barrel-shaped central pin surrounded by the cylindrical bore; and
   a cylindrical insert made of copper aluminium, copper alloy, or aluminium alloy and having an axial through hole, a top surface and grooves on the top surface, the insert being permanently seated in the cylindrical bore,
   wherein a top surface of the central pin is lowered by a distance from 0.1 mm to 0.6 mm below a top surface of the head.

2. The screw according to claim 1, wherein a radially outer surface of the cylindrical bore is parallel to an axis of the screw.

3. The screw according to claim 1, wherein a bottom of the cylindrical bore has the form of a circular sector with a radius of R from 0.8 L to 1.2 L, where L is equal to a difference between a diameter of the cylindrical bore and a diameter of the central pin.

4. The screw according to claim 1, wherein the top surface of the central pin has a concave shape.

5. The screw according to claim 1, wherein the walls of the central pin are convex towards the insert.

6. The screw according to claim 1, wherein the cylindrical bore is defined by a conical bottom with an inclination angle of α from 10° to 30°.

7. The screw according to claim 1, wherein the grooves are disposed concentrically with an axis of the screw.

* * * * *